Jan. 24, 1961 R. L. PHILLIPS 2,969,499
VOLTAGE REGULATOR
Filed Aug. 3, 1959 2 Sheets-Sheet 1
FIG_1
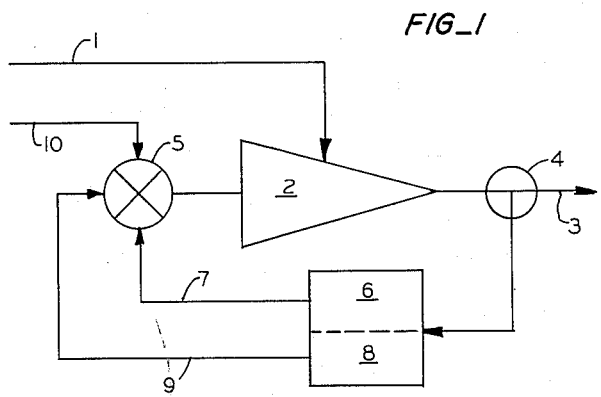
FIG_2
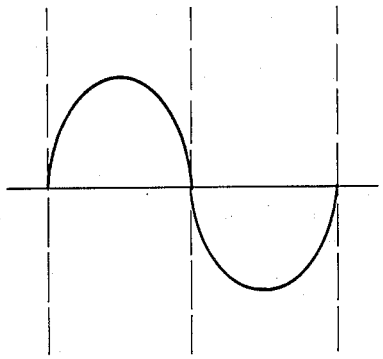
FIG_5
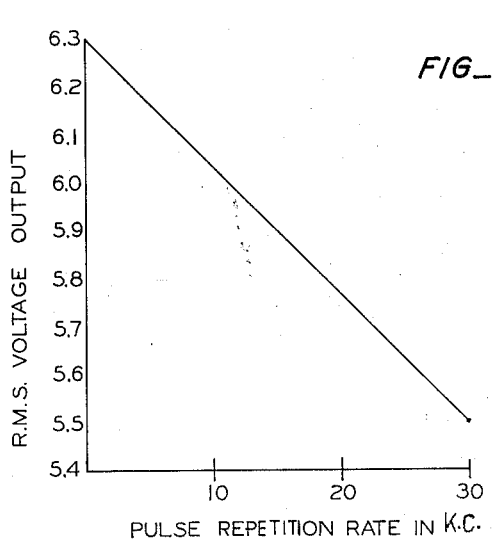
FIG_3
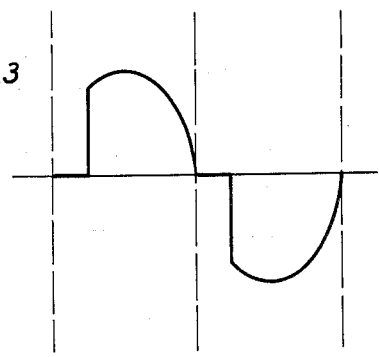
INVENTOR.
RICHARD L. PHILLIPS
BY
ATTORNEY

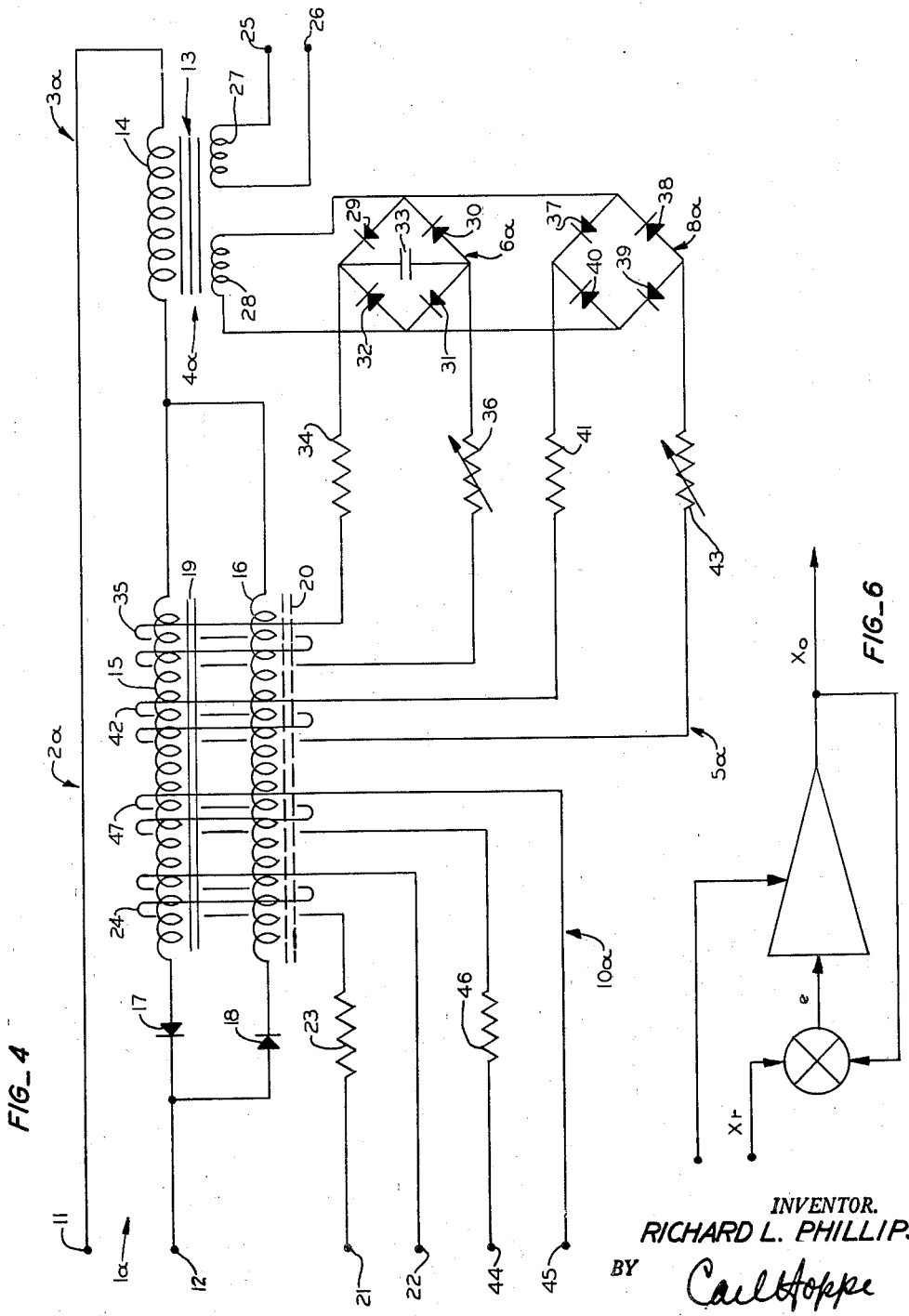

United States Patent Office 2,969,499
Patented Jan. 24, 1961

2,969,499

VOLTAGE REGULATOR

Richard L. Phillips, 1511 San Ysidro Drive,
Beverly Hills, Calif.

Filed Aug. 3, 1959, Ser. No. 831,240

3 Claims. (Cl. 323—67)

This invention relates to voltage regulators in general and more particularly to devices for regulating R.M.S. voltage.

It is an object of this invention to provide a simple device for regulating the R.M.S. voltage of a distorted wave form, such as a commutated sine wave.

It is a further object of this invention to provide a system in which the R.M.S. value of the wave form may be accurately programmed over a wide range of line, frequency and temperature variations to maintain a predetermined functional relationship between a variable input signal and an output R.M.S. voltage regardless of large variations in line voltage, line frequency and ambient temperature.

It is another object of this invention to provide simple magnetic amplifier means having novel circuitry performing the functions outlined in earlier mentioned objects of this invention.

The foregoing and other objects of this invention will become apparent to those skilled in the art upon an understanding of the following specification taken in conjunction with the accompanying drawing and the appended claims.

The invention is illustrated in a preferred embodiment in the accompanying drawing, in which:

Fig. 1 is a block diagram illustrating the applicant's invention;

Fig. 2 is an illustrative voltage wave form as it is fed to the input of the regulator illustrated generally in Fig. 1;

Fig. 3 is a voltage wave form as it appears at the output channel of the circuit illustrated diagrammatically in Fig. 1;

Fig. 4 is a circuit diagram schematically illustrating a circuit embodiment of this invention;

Fig. 5 is a graphic representation of a selected program for an external control signal which may be used in connection with the illustrative embodiment of this invention; and Fig. 6 is a block diagram illustrating a simple form of a servo amplifier.

*General nature of invention*

The general nature of applicant's voltage regulator is shown diagrammatically in Fig. 1. A source of power is connected by means of power input channel 1 to amplifier 2, the output of which is fed to a load channel 3. A sine wave such as that illustrated in Fig. 2 is supplied to the power input channel, and the characteristics of the amplifier 2 are such that the output wave form in load channel 3 is a distorted sine wave, such as the commutated sine wave form illustrated in Fig. 3.

Applicant has discovered that the summation of a signal proportional to the peak voltage appearing in output channel 3 with a signal proportional to the average voltage appearing in output channel 3 can be weighted to create a signal which is proportional to the R.M.S. voltage appearing in output channel 3. Applicant uses this weighted signal compared with a reference signal to control the R.M.S. output of the amplifier.

In general, sensor means 4, associated with the load channel 3, includes means for supplying two signals to summing amplifier control means 5. More specifically, means 6 are provided for supplying signal proportional to the peak voltage appearing in output channel 3 through a transfer channel 7 to summing amplification control means 5 and means 8 are provided for supplying a signal proportional to the average voltage appearing in load channel 3 through a transfer channel 9 to summing amplification control means 5.

In addition, applicant provides means 10 for supplying an external control signal to the summing amplifier control means 5 for controlling the output voltage in load channel 3 in response to externally controlled data.

With this understanding of the general nature of applicant's invention, the selected embodiment will become easily understand to those skilled in the art.

*Illustrative embodiment*

The best means which applicant presently contemplates for practicing his invention is the magnetic amplifier means illustrated diagrammatically in Fig. 4 of the drawings.

In the embodiment illustrated in Fig. 4, input channel 1a is provided with input terminals 11, 12 forming part of a circuit including a magnetic amplifier 2a and an output transformer 13 in load channel 3a. This circuit comprises input terminal 11, a primary winding 14 of output transformer 13, power windings 15, 16 of magnetic amplifier 2a, diodes 17, 18 and input terminal 12. This circuit arrangement is one commonly known to the art as the so-called "doubler" circuit.

It will be understood by those skilled in the art that the power winding 15 of the magnetic amplifier is wound upon a first core 19 indicated by solid lines, and that the power winding 16 is wound upon a second core 20 indicated by dotted lines. In the selected embodiment of this invention the cores 19 and 20 are formed in the shape of a toroid so as to provide a closed loop for the flow of magnetic flux with no air gaps in the loop.

A bias winding is provided around both of the cores 19 and 20 for supplying a reference magnetic bias to the magnetic amplifier 2a. These means include reference input terminals 21, 22 forming the terminals for a reference circuit comprising input terminal 21, a resistance 23, reference winding 24 and reference terminal 22.

The output circuit comprises output terminals 25, 26 and a secondary winding 27 of output transformer 13.

The foregoing circuitry is well-known to those skilled in the art and forms no part of the present invention other than that of an environment for the features now to be described, the combination with these other features forming what applicant deems to be his invention.

Sensor means 4a associated with the load channel 3a comprises a secondary winding 28 of the output transformer 13. Two rectifier circuits 6a and 8a are provided for supplying respectively a signal proportional to the peak voltage appearing in load channel 3a and a signal proportional to the average voltage appearing in load channel 3a to amplification control means 5a.

Rectifier circuit 6a for supplying a signal proportional to the peak voltage appearing in the load channel 3a, includes four diodes 29, 30, 31 and 32 arranged in a bridge circuit with a condenser 33 provided across the rectifier output. This signal is fed to a circuit comprising resistance 34, magnetic amplification control winding 35, and variable resistor 36. The winding 35 is wound around both magnetic amplifier cores 19, 20 in the same manner as bias control winding 24.

Means 8a for supplying a signal proportional to the average voltage appearing in load channel 13 comprise a bridge rectifier circuit including four diodes 37, 38, 39 and 40. The direct current output of the bridge rectifier is supplied to a circuit comprising resistor 41, magnetic amplification control winding 42, and variable resistor 43. The winding 42 is likewise wound around both of the magnetic amplifier cores 19, 20.

It will become apparent to those skilled in the art upon a consideration of the circuitry just described that the combined effect upon the amplifier of the signals supplied to control windings 35 and 42 is a consequence of a summation of the peak voltage signal and the average voltage signal supplied to the windings 35 and 42. In the practice of this invention the signals are adjusted so that this weighted signal is made proportional to the R.M.S. voltage appearing in load channel 3a.

Means 10a for supplying an external control signal to the magnetic amplifier 2a comprise control signal terminals 44, 45. These control terminals 44, 45 form the termini for a circuit including resistor 46 and amplification control winding 47. The winding 47 is likewise wound about both magnetic amplifier cores 19, 20 in the manner of the previous windings.

Values of components

The values of the various components can be readily computed by those skilled in the art upon a consideration of the specific problem at hand. In applicant's practice of the preferred embodiment of the invention, applicant has used the voltage regulator in an environment in which the device was used to apply a line voltage of 115 volts R.M.S plus/minus 10% and having a frequency of from 380 cycles per second to 1600 cycles per second to supply the filament voltage of a magnetron. In the specific embodiment, the specific magnetron was designed with a filament resistance of 13 ohms plus or minus 10% and was designated for a normal R.M.S. filament voltage of 6.3 volts minus .029 times the pulse repetition rate in kilocycles plus or minus 2%.

For such an action the preferred embodiment of this invention may be practiced by using the following values for the several components.

The cores for the magnetic amplifier 2a are formed in the shape of a toroid having an inner diameter of 1 inch, an outer diameter of 1⅜ inches and a thickness of ¼ inch. The core is made from high-permeability magnetic material such as grain-oriented 50% nickel–50% iron alloy, sold under the trademark of Deltamax. After the power windings are wound on each core, the two cores are sandwiched together and then the various reference and control windings are wound about both cores.

The several windings may be tabulated as follows:

| Winding | Wire Size | No. of Turns |
|---|---|---|
| Power winding 15 | #40 | 1,000 |
| Power winding 16 | #40 | 1,000 |
| Reference winding 24 | #42 | 5,800 |
| Control winding 35 | #42 | 2,000 |
| Control winding 42 | #42 | 2,000 |
| Control winding 47 | #42 | 5,000 |

The values of the several resistors are as follows:

Resistance: Value, ohms
- Fixed resistance 23 _____ 36,000
- Fixed resistance 34 _____ 2,850
- Variable resistance 36 _____ 1,500
- Fixed resistance 41 _____ 1,500
- Variable resistance 43 _____ 2,000
- Fixed resistance 46 _____ 2,000

The reference voltage supplied to terminals 21 and 22 is 300 volts D.C.

The pulse repetition rate signal applied to terminals 44 and 45 is a D..C voltage acting to change the R.M.S. output voltage as a function of pulse repetition rate. At zero pulse repetition rate signal, the reference signal applied to terminals 21 and 22 provides an output of 6.3 volts R.M.S. At a pulse repetition rate greater than zero the pulse repetition rate will, in effect, be subtracted from the reference signal to provide an output less than 6.3 volts R.M.S. corresponding to the relationship depicted in Fig. 5.

Mathematics of invention

In order to aid those skilled in the art to practice this invention in modified forms, the mathematics of the operation of the voltage regulator should prove to be helpful.

First let us consider a typical servo system with reference to its most primitive form as shown in Fig. 6. A quantity $X_r$ which may be a constant or a variable is compared with an output quantity $X_o$, and the difference is amplified in a high gain amplifier. The difference between the reference quantity $X_r$ and $X_o$ is less than a specified maximum $e$. The regulation is $$\frac{e}{X_r} \times 100 \text{ percent}$$

If the gain of the amplifier is designated as A, the following equations relating to the steady state behavior of the system are self-explanatory:

(1) $\qquad X_r - X_o = e$ (2) $\qquad Ae = X_o$ (1a) $\qquad X_r - X_o = \frac{e}{A}$ As the gain of the amplifier is increased without limit, there is a one-to-one correspondence between $X_r$ and $X_o$.

In electromechanical systems of the type for which the specific embodiment of this invention is intended, the quantity $X_r$ is the command signal and the quantity $X_o$ is the actual quantity to be regulated. If $X_r$ is a D.C. voltage, $X_o$ can be a D.C. voltage functionally related to a tachometer, discriminator or the output of a D.C. amplifier. Such techniques are in common usage in the electrical industry to provide regulation of speed, frequency, voltage and the like, and the basic technique is well-known to those skilled in the art. The difficulty arises in comparing a distorted A.C. output voltage with a D.C. reference and providing a one-to-one correspondence between the R.M.S. value of the output quantity $X_o$ and a variable reference $X_r$.

The mathematics of this specific circuit should be considered in the light of the block diagram shown in Fig. 1 and the typical A.C. magnetic amplifier output wave form shown in Fig. 3. The equation for the steady state performance for the regulator shown in Fig. 1 is (3) $\qquad X_r - k_a X_o - k_p X_o - X_c = e$
$\qquad\qquad e \to 0$ where $X_r$ = ampere turns proportional to a reference voltage
$k_a X_o$ = ampere turns proportional to the average output voltage
$k_p X_o$ = ampere turns proportional to the peak output voltage
$X_c$ = ampere turns proportional to the pulse repetition rate With a high gain amplifier, the output voltage $X_o$ is adjusted by circuit action to instrument Equation 3.

In selecting the amount of weighted peak and average sensing required to simulate actual R.M.S. sensing, reference should be had to Fig. 3.

The average rectified value of this wave form is:

$$E_{av} = \frac{1}{\pi}\int_{\alpha}^{\pi} E\max \sin\theta\, d\theta$$

(4)
$$= \frac{E\max}{\pi}(1+\cos\alpha)$$

The peak value is simply E max.
The R.M.S. value is $$E_{R.M.S.} = \sqrt{\frac{1}{\pi}\int_{\alpha}^{\pi}(E\max)^2 \sin^2\theta\, d\theta}$$

(5)
$$= E_{\max}\left[1/2 - \frac{\alpha}{2\pi} + \frac{\sin 2\alpha}{4\pi}\right]^{1/2}$$

Let a $k_a$th portion of the average output be added to a $k_p$th portion of the peak output; thus, (6)
$$\frac{k_a E_{\max}(1+\cos\alpha)}{\pi} + k_p E_{\max} = E_{\max}\left[1/2 - \frac{\alpha}{2\pi} + \frac{\sin 2\alpha}{4\pi}\right]^{1/2}$$

(6a)
$$\frac{k_a(1+\cos\alpha)}{\pi} + k_p = \left[1/2 - \frac{\alpha}{2\pi} + \frac{\sin 2\alpha}{4\pi}\right]^{1/2}$$

With $\alpha$ as an independent variable, the R.M.S. sensing can be made exactly equal to the weighted peak and average values at two values of the "firing angle." The maximum sensing error for intermediate values of $\alpha$ can then be checked by numerical methods.

It should be noted that in the circuit of Fig. 4, resistors 36, 43 are provided to alter the weighted peak and average sensing.

The equation of (6a) can be made exactly accurate at two arbitrary values of $\alpha$ by selecting $k_a$ and $k_p$ corresponding to values of $\alpha$ consistent with the specified line variations. Numerical methods must be used to check intermediate points.

Two simultaneous equations in $k_a$ and $k_p$ result from the selection of two "firing angles." Thus:

$$\frac{k_a(1+\cos\alpha_1)}{\pi} + k_p = \left[1/2 - \frac{\alpha_1}{2\pi} + \frac{\sin 2\alpha_1}{4\pi}\right]^{1/2}$$

$$\frac{k_a(1+\cos\alpha_2)}{\pi} + k_p = \left[1/2 - \frac{\alpha_2}{2\pi} + \frac{\sin 2\alpha_2}{4\pi}\right]^{1/2}$$

From an understanding of the specific embodiment of this invention and the mathematical principles involved, it will become apparent that the instant invention is applicable to non-linear amplifiers in general as well as the specific magnetic amplifier shown in this application and that the technique here disclosed of approximating R.M.S. sensing should find many applications where the life expectancy and reliability of equipment is enhanced by adequate control of the R.M.S. voltage. Therefore, in this light the foregoing detailed description has been given for clearness of understanding only and no unnecessary limitations should be understood therefrom, for modifications will be obvious to those skilled in the art.

I claim:

1. A control system including power input means; load output means; a control circuit connecting said power input means and said load output means; said control circuit including a high gain amplifier, and a return loop including means for sensing a first signal proportional to the peak voltage across said load output means, means for sensing a second signal proportional to the average voltage across said load output means, and means for summing said first and second signals together with a reference and functioning to control the output of said amplifier.

2. A control system including a first circuit having power input terminals, an output load circuit and a doubler type saturable core magnetic amplifier all connected in series; means associated with said output load circuit for producing a direct current control signal having a voltage proportional to the peak voltage in said output load circuit; means associated with said output load circuit for producing a direct current control signal having a voltage proportional to the average voltage in said output load circuit; and means for summing said control signals to produce a D.C. control signal effect proportional to the R.M.S. voltage of said output load circuit for controlling the core saturation of said magnetic amplifier.

3. A control device including power input terminals, a magnetic amplifier having at least two saturable cores, at least two power windings, each being wound upon a separate core, and at least two control windings, both being wound upon both cores; a power transformer including a primary winding and at least one secondary winding; two diodes; a circuit connecting said power input terminals, said primary of said transformer and said power windings and diodes in a doubler circuit arrangement; a first full wave rectifier having input terminals and output terminals, a first circuit connecting the said secondary of said transformer to said input of said full wave rectifier; a second circuit connecting the output of said rectifier to one of the control windings of said magnetic amplifier; a second full wave rectifier having input terminals and output terminals, a third circuit connecting the said secondary of said transformer to the input of said full wave rectifier; a fourth circuit connecting the output of said second full wave rectifier to another of the control windings of said magnetic amplifier, and a condenser connected across the output terminals of said second full wave rectifier.

No references cited.